United States Patent Office 3,809,542
Patented May 7, 1974

3,809,542
GLASS CERAMIC MATERIALS
Stanley Lythgoe, Parbold, and Philip Sidney Irlam, Southport, England, assignors to Pilkington Brothers Limited, Lancashire, England
Filed Feb. 15, 1972, Ser. No. 226,482
Claims priority, application Great Britain, Feb. 19, 1971, 5,019/71
The portion of the term of the patent subsequent to May 7, 1991, has been disclaimed
Int. Cl. C03b 18/00, 29/00
U.S. Cl. 65—33                                                          7 Claims

ABSTRACT OF THE DISCLOSURE

A method and apparatus for manufacturing glass ceramics from crystallizable vitreous material are disclosed, in which the temperature of the vitreous material is regulated to a value at which uniform dispersion of embryonic centers of incipient crystal growth is generated throughout the material and the material is supported on a hot gaseous support, and thereafter the material is rapidly heated on its gaseous support to a crystallization range of temperature and held in that range on the gaseous support to transform the material to a glass ceramic by fine-grained crystal growth on those centers. The gaseous support may be provided by hot gas directed through perforated tiles on to the underside of the material. Hot gas may be directed on to both sides of the material to effect the rapid heating of maintenance in the crystallizations range, while the material is supported by the gas directed at it from one side. The thermal processing may be effected in a continuous manner in a furnace divided into a center-generating zone, a gradient zone, a crystallization zone and a cooling zone.

BACKGROUND OF THE INVENTION

(1) Field of the invention

This invention relates to glass ceramic materials and methods and apparatus for manufacturing those materials.

(2) Description of the prior art

Controlled crystallization of vitreous materials to form strong glass ceramic materials is a known technique, which has been employed for manufacturing glass ceramic materials from glasses of the following systems:

$SiO_2$—$Al_2O_3$—$Li_2O$
$SiO_2$—$Al_2O_3$—$MgO$
$SiO_2$—$Al_2O_3$—$BaO$

Usually the vitreous material contains a proportion of a nucleating oxide, e.g. $TiO_2$, $ZrO_2$ or $P_2O_5$.

Customarily a degree of nucleation is developed in the glass, which has already been formed to desired shape usually by moulding, and thereafter the nucleated material is slowly heated at a slow rate, e.g. 5° C. min.$^{-1}$, to ensure that at the onset of crystallization and throughout crystallization the glass is sufficiently viscous to hold its shape. This slow heating, often over several hours, is regulated so that a balance is struck between the increase in stiffness of the material due to its increasing crystallinity, and the decrease in viscosity of the vitreous matrix in which crystal growth is taking place. The slow heating rate also ensures that no damaging stresses are generated.

It has now been discovered that crystallization can occur on the basis of a dispersion of embryonic centers of crystal growth in the crystallizable vitreous material, which dispersion is itself insufficiently developed to produce a self-supporting network of crystals within the material, if the material is rapidly heated from a temperature at which that dispersion exists to a selected crystallization temperature range which is conducive to rapid crystal growth on those centers.

It is a main object of the present invention to employ that discovery in an improved method and apparatus for manufacturing glass ceramic material.

SUMMARY

According to the invention a method of manufacturing a glass ceramic from a crystallizable vitreous material, comprises regulating the temperature of the material to a value at which a uniform dispersion of embryonic centers of incipient crystal growth is generated throughout the material, supporting the vitreous material on a hot gaseous support, and thereafter rapidly heating the material on its gaseous support to a crystallization range of temperature and holding the material in that temperature range on the gaseous support to transform the material to a glass ceramic by fine-grained crystal growth on those embryonic centers.

In this specification, reference is made to generating a uniform dispersion of embryonic centers of incipient crystal growth, to distinguish from the conventional nucleation procedure in which substantial accretions of crystal growth are formed.

The method may be performed in a continuous manner by forming a series of sheets of said vitreous material and heating them to said temperature at which the dispersion of centers of incipient crystal growth is generated, advancing the sheets sequentially along the gaseous support and heating them rapidly during their continued advance up to the crystallization range, holding the sheets in that temperature range while they continue to advance along the gaseous support, and then cooling the sheets of glass ceramic material so formed prior to removing them from the gaseous support. The sheets may be heated up to the temperature at which the dispersion is generated while being advanced by a conveyor to the gaseous support.

Alternatively, for manufacturing glass ceramic material in continuous ribbon form, the method may be performed by continuously forming a ribbon from a melt of said vitreous material, cooling the ribbon to said temperature at which the dispersion of centers of incipient crystal growth is generated, advancing the ribbon along the gaseous support and heating the advancing material rapidly to the crystallization range and maintaining the ribbon at that temperature while it continues to advance, and then cooling the ribbon of glass ceramic material so formed prior to removing it from the gaseous support.

The invention also resides in apparatus for manufacturing a glass ceramic from a crystallizable vitreous material, comprising a furnace unit incorporating a hot gaseous support for the vitreous material, means for feeding the vitreous material through the furnace unit, and means for regulating the temperature of the material during its passage through the furnace unit in such manner that the temperature of each successive portion of the material is first regulated to a value at which a uniform dispersion of embryonic centers of incipient crystal growth is generated, is then rapidly raised to a crystallization range of temperature and maintained in that temperature range to transform the material into a ceramic, and is then lowered to enable the ceramic to be removed without damage from the furnace unit.

Preferably the furnace unit comprises a center-generating zone in which the temperature of the material can be regulated to the value at which the dispersion of centers of crystal growth is generated, a gradient zone in which the rapid heating can be effected, a crystallization zone in which the material can be held in the crystallization temperature range and a cooling zone in which it can be cooled to handling temperature. The gaseous support may comprise a series of perforated tiles and means for supplying hot combustion gases to the underside of said tiles.

DESCRIPTION OF THE PREFERRED EMBODIMENTS

Figure 1:
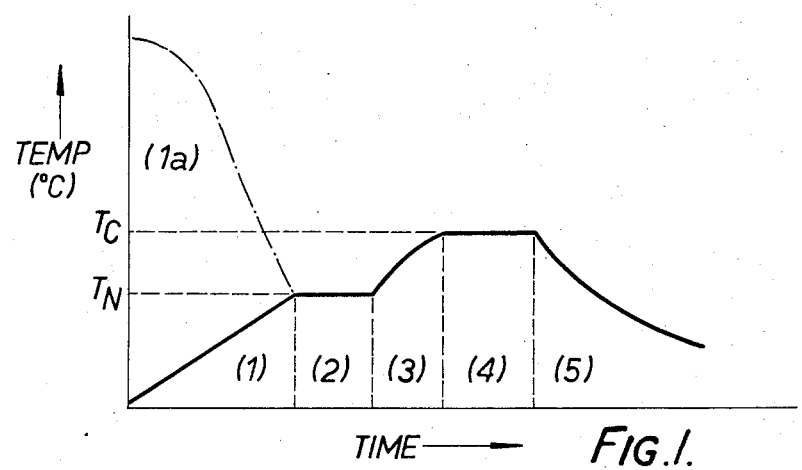
FIG. 1 is a diagram illustrating the manufacture of a glass ceramic material, showing the temperature of the material plotted against time.

FIG. 1 illustrates a method of forming a glass ceramic material, in which a vitreous material is held at a temperature $T_N$ for a time sufficient to generate a uniform dispersion of embryonic centers of incipient crystal growth in the material (section (2) of the curve), and is then rapidly heated (section (3)) to a crystallization temperature $T_C$ and held at that temperature (section (4)) to transform the material into a glass ceramic by fine-grained crystal growth on those centers, after which the material is cooled (section (5)).

In FIG. 1, section (1) of the curve indicates that the starting material is glass at room temperature, which is heated up to the temperature $T_N$. Alternatively, as shown in chain-dot line at (1a), the starting material may be molten glass which is rapidly cooled to the temperature.

Figure 2:
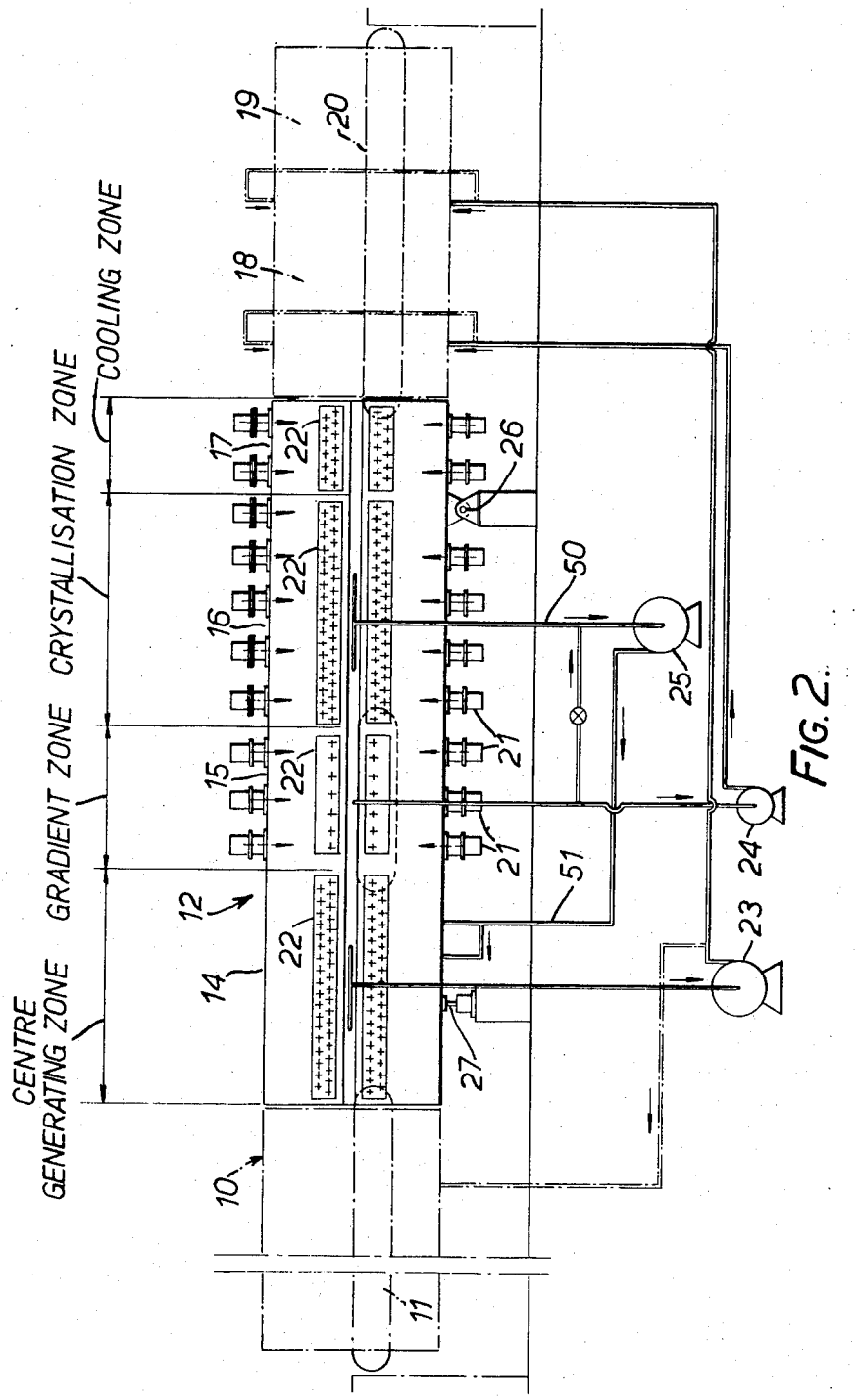
FIG. 2 is a diagrammatic sectional elevation of an apparatus according to the invention for manufacturing glass ceramic material.

FIG. 2 illustrates diagrammatically an apparatus for carrying out the method illustrated in FIG. 1. It comprises a first unit 10, comprising a known type of lehr furnace enclosing a conveyor 11 for transporting glass plates through the lehr, in which they are preheated up to the temperature $T_N$ in accordance with section (1) of the curve of FIG. 1. For the alternative case in which molten glass is cooled to the temperature $T_N$ (section (1a) of FIG. 1), the unit 10 may alternatively comprise means of known type for receiving the molten glass, forming it into a ribbon, cooling it and feeding it through the unit 10.

Adjacent to the unit 10 is a multiple furnace unit 12 in which the glass, whether in the form of plates or of a ribbon, is supported and carried along on a hot gaseous support, comprising perforated tiles through which hot gases are passed, as described in more detail below with reference to FIGS. 3 to 5. The multiple unit 12 comprises a center-generating zone 14 in which the temperature of the glass is held constant at $T_N$, a gradient zone 15 in which the temperature of the glass is rapidly raised to the crystallization temperature $T_C$, a crystallization zone 16 in which the glass is held at that temperature while crystallization converts it into a glass ceramic, and a cooling zone 17 in which the glass ceramic is cooled to a temperature at which it can be handled by mechanical means without damage.

Adjacent to the cooling zone 17 is a cooling and conveying unit 18 comprising a housing 19 through which gases at controlled temperatures can be passed and which encloses a conveyor 20 for receiving the glass from the cooling zone 17 and passing it through the unit 18.

The furnace unit 12 is provided with a plurality of burners indicated diagrammatically at 21 and spaced along the length of the gradient zone 15, the crystallization zone 16 and the cooling zone 17. Burners are required in the zone 17 to ensure that the cooling rate is not too rapid. Electrical radiant heaters 22 may also be provided in all four zones 14, 15, 16, 17. Regulating fans 23, 24, 25 are provided for recirculating hot gases from and to the various zones as described below. The body of the furnace unit 12 is shown as being pivotally mounted at 26 and adjustable vertically at 27 for levelling purposes.

Figure 3:
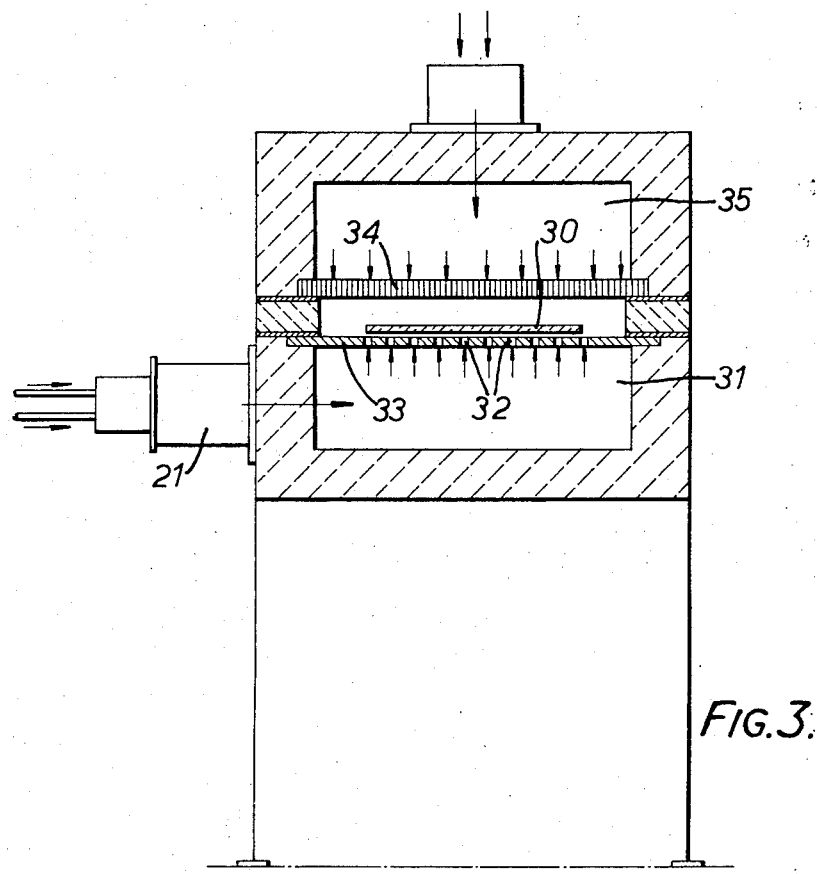
FIG. 3 is a diagrammatic cross-section through a furnace which may be used in the apparatus of FIG. 2.

FIG. 3 shows a diagrammatic cross-section through one form of construction of the furnace in the crystallization zone 16. In this form, a glass ribbon or plate 30 which is being converted into a glass ceramic is supported on a hot gaseous cushion formed by combustion gases from a burner 21 which are led into a lower plenum chamber 31 and then pass through apertures 32 in a perforated stainless steel tile 33. The upper surface of the ribbon or plate 30 is heated by radiation from a burner of known type consisting of a porous wall 34, a combustible mixture of air and gas (e.g. methane) being supplied to an upper plenum chamber 35 so that the combustible mixture permeates through the porous wall 34 and is ignited on its lower surface.

Figure 4:
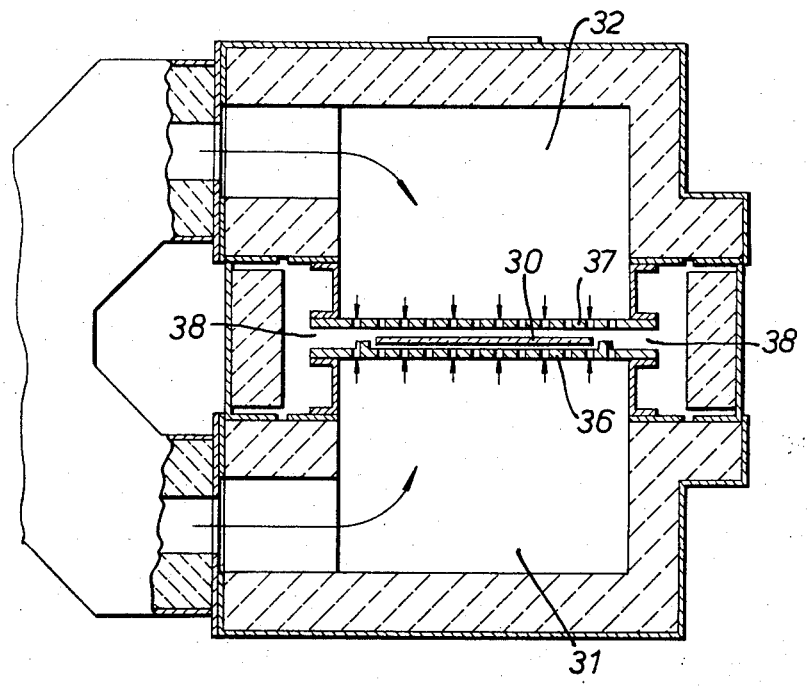
FIG. 4 is a similar view of an alternative design of furnace.

FIG. 4 illustrates an alternative construction for the crystallization zone 16 of the furnace unit 12, designed to ensure more even application of heat to the upper and lower surfaces of the ribbon or plate 30. In this construction, the hot gases produced by combustion in a burner (not shown) enter both the lower plenum chamber 31 and the upper plenum chamber 32. The ribbon or plate 30 is disposed between two perforated stainless steel tiles 36, 37. As before, it is supported on the hot gaseous cushion provided by gas passing through the perforations in the lower tile 36. At the same time it is heated on its upper surface by gas passing through the perforations in the upper tile 37. After heating the ribbon or plate 30, the gas is withdrawn through lateral ducts 38 for recirculation.

Figure 5:
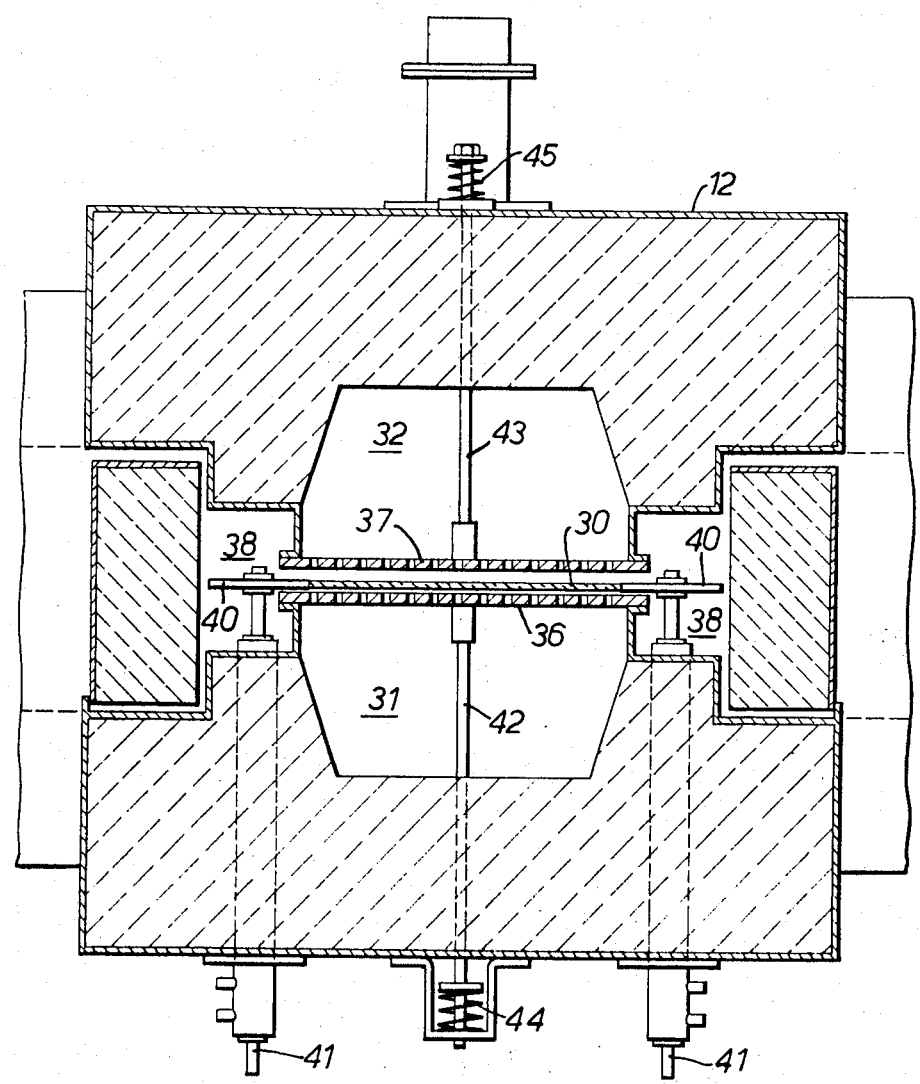
FIG. 5 is a further similar view of a construction similar to that of FIG. 4 but including means for transporting the glass material through the gradient zone of the furnace.

FIG. 5 illustrates a modification of the construction of FIG. 4, for use in the gradient zone 15 of the furnace unit 12. In this zone, to ensure that the ribbon or plate 30 is heated at the desired rate from the temperature $T_N$ to the crystallization temperature $T_C$, it is necessary to provide driving means for propelling the ribbon or plate forwardly. As shown in FIG. 5, these means may comprise a series of horizontal driving wheels 40 disposed in the recirculation ducts 38 and dimensioned so as to make light frictional contact with the edges of the ribbon or plate 30. The wheels 40 are mounted on vertical shafts 41 which pass through the lower part of the furnace unit 12 and are driven by means (not shown). In the embodiment shown in FIG. 5, the upper and lower perforated tiles 36, 37 are mounted on vertical rods 42, 43 respectively which pass through the upper and lower parts of the furnace unit 12 and are attached thereto through respective coil springs 44, 45, thus allowing the tiles 36, 37 to move vertically against the springs to a limited extent.

Reverting to FIG. 2, it will be seen that the hot gases, after heating the plate or ribbon 30, are withdrawn via the ducts 38 and a line 50 by the recirculating fan 25 which delivers them through a further line 51 to the center-generating zone 14. The recirculated gases are still at a sufficiently high temperature for no burners 21 to be required in the zone 14, though electrical radiant heating elements 22 may be provided as shown. The fan 23 exhausts the gases from the zone 14 and passes them to the preheating unit 10 and to the rear end of the cooling and conveying unit 18. The fan 24 draws gases from the recirculating ducts 28 in the gradient zone 15 and passes them to the forward part of the cooling and conveying unit 18. This circulating arrangement enables the number of burners 21 to be kept to a minimum and the maximum use to be made of the heat generated therein.

In use, glass plates of appropriate dimensions may be cast and fed one by one to the conveyor 11 of the preheating unit 10. As they pass through the unit 10 they are heated up to the temperature $T_N$ and they are then delivered in turn to the zone 14 of the furnace unit 12. During the whole of their subsequent travel through the furnace unit 12, they are supported on the hot gas cushion provided by the gases passing up through the respective lower perforated tiles. In the center-generating zone 14 they are advanced by contact with fresh plates received from the conveyor 11. In the gradient zone 15 a higher speed of advance is generally required and so the plates are conveyed by frictional contact between their edges and the eges of the driving wheels 40, while being heated rapidly up to the crystallization temperature $T_C$, the heat supplied and the conveying speed being adjusted to produce the desired rate of heating in the glass. On arriving in the crystallization zone 16, the plates may be slowed down by air jets or frictional parts (not shown). In the crystallization and cooling zones 16, 17 advance of the glass ceramic plates is again effected by contact with further plates arriving from behind, while the glass is first crystallized and then cooled to a temperature at which it can be handled by mechanical means without damage. Finally the conveyor 20 transports the glass ceramic plates through the unit 18, and may deliver them to a stacking device (not shown).

To alter the thermal treatment imparted to the glass sheets, the speeds of the conveyors 11, 20 or of the driving wheels 40 may be varied, so as to vary the times for which the glass plates are exposed to the various steps in the treatment. The amounts of fuel delivered to the burners 21 and of current delivered to the heaters 22, may be regulated to control the temperatures in the various zones. The speeds of the fans 23, 24, 25 may also be regulated for the same purpose. The lengths of the various zones may also be altered.

Some vitreous materials require so short a period for development of the required uniform dispersion of embryonic centers of incipient crystal growth that it is sufficient merely to heat them through the temperature $T_N$, without a hold at that temperature. For such materials, the zone 14 may be omitted.

In the alternative construction referred to above, in which molten glass is supplied to the first unit 10, the glass composition is melted and the homogeneous melt produced is then formed into a flat strip, in customary manner. For example the melt is poured in known manner to form a continuous glass ribbon which is fed over a porous apron, e.g. of carbon through which a gas is forced to form a lubricating film over the carbon apron surface, to the horizontal gas support in the center-generating zone 14. The speed of advance of the ribbon then depends on the pouring rate and on the speed of the conveyor 20.

Whether plates or a continuous ribbon are used, in the center-generating zone the material moves over a part of the gaseous support where its temperature is for a predetermined time within a temperature range which is conducive to the generation throughout the material of a uniform dispersion of embryonic centers of incipient crystal growth.

Thereafter, as the material passes through the gradient zone it is subject to rapid heating, and the temperature of the heaters and/or burners and the time which an increment of the material takes to pass them are selected so that the material is rapidly heated, as it travels along its gaseous support, to a crystallization range of temperature. There is a substantial rate of crystal growth without an undesirable degree of reabsorption of the embryonic centers into the vitreous matrix. Crystal growth is initiated on a high proportion of the centers so that the final product is a fine-grained glass ceramic material, and throughout the crystal growth the material is supported on the gaseous support thereby ensuring that the material is unimpaired by any lowering of viscosity of the vitreous matrix during the initiation of crystal growth, that is before the degree of crystallinity is such as to obviate deformation of the ribbon.

By the time the material emerges from the crystallization zone it has been transformed to the desired glass ceramic material, which is cooled during its travel through the cooling zone, over the final stage of the gaseous support, before transfer to the conveyor 20 and subsequent further cooling. If in the form of a ribbon, it is then cut into sheet form.

The invention is applicable to a wide range of vitreous materials which are capable of crystallization to form a glass ceramic. Materials containing $SiO_2$, and one or more of the components $Al_2O_3$, $MgO$, $BaO$, $Li_2O$ and $ZnO$ are effective for the production of high strength, fine-grained ceramic materials when subjected to rapid thermal transformation on a gaseous support.

Table 1 sets out in percentages by weight some glass compositions which can be employed. Each of the tabulated glasses contains $ZrO_2$, $TiO_2$, $F_2$, and/or $P_2O_5$ as nucleating agent.

TABLE 1

| Glass number | 1 | 2 | 3 | 4 | 5 | 6 | 7 | 8 | 9 |
|---|---|---|---|---|---|---|---|---|---|
| Weight percent: | | | | | | | | | |
| $SiO_2$ | 68.4 | 54.8 | 65.4 | 66.1 | 68.5 | 68.6 | 71.6 | 68.3 | 68.4 |
| $Al_2O_3$ | 14.0 | 28.5 | 18.5 | 18.4 | 19.1 | 19.2 | 19.4 | 18.0 | 17.6 |
| $Li_2O$ | 12.1 | 4.3 | 5.45 | 3.7 | 3.8 | 3.8 | 4.0 | 2.5 | 2.7 |
| $ZnO$ | | 3.6 | | 3.0 | 3.1 | 3.1 | 0.9 | 0.9 | 2.3 |
| $ZrO_2$ | | 3.6 | 6.25 | 6.8 | 1.5 | 3.3 | 1.5 | | 2.0 |
| $Na_2O$ | | 0.2 | | 0.4 | 0.4 | 0.4 | 0.5 | 0.5 | 0.2 |
| $K_2O$ | 2.5 | | | 0.1 | 0.1 | 0.1 | 0.2 | | |
| $P_2O_5$ | 3.0 | 4.2 | | 1.5 | 1.5 | 1.5 | | | 1.8 |
| $MgO$ | | 0.8 | | | | | | 2.9 | |
| $B_2O_3$ | | | 4.4 | | | | | 1.0 | 1.0 |
| $TiO_2$ | | | | | 2.0 | | 1.3 | 3.7 | 2.0 |
| $F_2$ | | | | | | | 0.3 | 2.0 | 2.0 |
| $CaO$ | | | | | | | | 0.3 | 0.2 |

Some examples of operation of the method of the invention will now be given.

EXAMPLE 1

Glass No. 1 was melted and formed into a sheet 1 meter square and 6 mm. thick which was placed on a gaseous support bed of the kind illustrated in FIG. 3.

The glass sheet was heated to 500° C., to develop the required uniform dispersion of embryonic centers of incipient crystal growth. It was found unnecessary to hold the glass at this temperature because the centers form so rapidly.

Then the glass was heated at a rate of 80° C. min.$^{-1}$ to a temperature of 880° C. at which temperature the material was held for 3 minutes to complete the desired crystallization.

EXAMPLE 2

Glass No. 1 was subjected to a similar process to that described in Example 1. After heating to 500° C. the crystallizable material was heated at the rate of 30° C. min.$^{-1}$ to 950° C. and was held at 950° C. for 5 minutes. The resulting glass ceramic material had a modulus of rupture of 114 MNm.$^{-2}$ and consisted of β-eucryptite solid solution with lithium metasilicate, with a crystal size of about 5 μm.

EXAMPLE 3

Glass No. 2 was held on the gaseous support at 770° C. for 15 minutes to generate a uniform dispersion of embryonic centers of incipient crystal growth. Thereafter the crystallizable material so formed was rapidly heated at a rate of 60° min.$^{-1}$ to 900° C. and retained at 900° C. for 13 minutes. Crystallization was thereby initiated and was completed by finally heating the semi-crystalline material at a rate of 56° C. min.$^{-1}$ to 1080° C., at which temperature crystallization was completed in a further 5 minutes. The glass ceramic formed consisted essentially of β-eucryptite solid solution with a crystal size of 5 to 10 μm.

EXAMPLE 4

Glass No. 3 was held on the gaseous support at 77° C., for 7 minutes. Then the crystallizable material was rapidly heated at a rate of 30° C. min.$^{-1}$ to 1080° C., which temperature was maintained for 10 minutes to complete the desired crystallization. The resulting crystalline glass ceramic material consisted of β-eucryptite solid solution with tetragonal zirconia of a crystal size of 1 to 5 μm. The modulus of rupture was 99 MNm.$^{-2}$.

EXAMPLE 5

Glass No. 4 was held at 770° C. for 15 minutes on the gaseous suport. Then the material in crystallizable form was heated at a rate of 30° C. min.$^{-1}$ to 1080° C. at which temperature it was held for 8 minutes to transform it to the desired glass ceramic material, which after cooling was found to consist of β-spodumene solid solution, tetragonal zirconia and β-quartz with a crystal size of 1 to 2 μm. The modulus of rupture was 102 MNm.$^{-2}$.

EXAMPLE 6

Glass No. 6 was held at 770° C. for 10 minutes on the gaseous support. Then the material was heated at a rate of 56° C. min.$^{-1}$ to 1040° C. and held at that temperature for 5 minutes to complete crystallization. The glass ceramic material produced was found to consist of β-spodumene and tetragonal zirconia with a crystal size of 5 to 10 μm. The modulus of rupture was 93 MNm.$^{-2}$.

EXAMPLE 7

Glass No. 7 was held at 750° C. for 10 minutes on the gaseous support and then heated at a rate of 64° C. min.$^{-1}$ to a temperature of 1070° C., at which it was held for 7 minutes for transformation to the desired glass ceramic material. This was found to consist of β-eucryptite solid solution and β-spodumene with a crystal size of approximately 1 μm. and a modulus of rupture of 111 MNm.$^{-2}$.

EXAMPLE 8

Glass No. 5 was held at 770° C for 20 minutes on the gaseous support and then heated at a rate of 78° C. min.$^{-1}$ to a temperature of 1080° C. at which it was held for 7 minutes to complete crystallization. The glass ceramic material was found to consist of β-eucryptite solid solution with a crystal size of approximately 1 μm. The modulus of rupture of 99 MNm.$^{-2}$.

EXAMPLE 9

Glass No. 8 was held at 700° C. for 8 minutes on the gaseous support and then heated at a rate of 28° C. min.$^{-1}$ to 1060° C. at which it was held for 8 minutes. The glass ceramic produced consisted of β-eucryptite solid solution with a crystal size of approximately 1 μm. The modulus of rupture was 100 MNm.$^{-2}$.

EXAMPLE 10

Glass No. 9 was held at 720° C. for 8 minutes on the gaseous support and then heated at a rate of 72° C. min.$^{-1}$ to 1080° C. at which it was held for 8 minutes. The glass ceramic produced consisted of β-eucryptite solid solution with a crystal size of approximately 1 μm. The modulus of rupture was 116 MNm.$^{-2}$.

The method of the invention may be employed for the treatment of pieces of vitreous material, for example specially shaped pieces to be used in the manufacture of heating devices such as cooker tops or sole plates for irons. The cut shaped pieces of flat material are placed in succession on the gaseous support at a loading station, being engaged with a locating and driving arrangement of known kind for advancing the cut pieces along the gaseous support for treatment to convert them to a glass ceramic.

In the course of the transformation process the pieces of material may be bent to curved form by employing a specially shaped perforated steel bed which gradually curves from a flat form receiving the flat sheets to a curved form on which the sheets can deform under gravity when they are at high temperature and in a deformable state as the crystallization process is proceeding at high temperature. The curving of the pieces of vitreous material would usually take place at the same time as the material is being subjected to radiant heat so that both the bed and the radiant heater may be of transversely curved configuration in the region where the temperature of the material reaches a maximum. Thereafter the rest of the bed extending through the cooling region has a transversely curved configuration to match the curvature of the pieces of glass ceramic material..

We claim:

1. A method of manufacturing a fine-grained glass ceramic from a thermally crystallizable vitreous material in sheet form, comprising shaping the material into sheet form, heating the material to a temperature to generate a uniform dispersion of embryonic centers of incipient crystal growth without substantial accretion of crystalline materil throughout the material, supporting the vitreous material throughout the material, supporting the vitreous heating the material on its gaseous support to a predetermined crystallization temperature range by supplying heat to said material from both sides, and continuing the supply of heat from both sides of said material so as to hold the material in said crystallization temperature range on the gaseous support to transform the material to a glass ceramic by fine-graned crystal growth on said embryonic centers, said controlled rate of rapid heating being sufficient to avoid substantial reabsorption of embryonic centers into the material, said rapid heating being accomplished while the viscosity of the vitreous material is at a value obviating deformation of the sheet of glass ceramic material.

2. A method according to claim 1, wherein the material is heated to and held in the crystallization range of temperature by directing hot gas on to both sides of the vitreous material while the said material is supported by the gas directed at it from one of said sides.

3. A method according to claim 2, wherein the gas is directed on to the vitreous material through perforated tiles.

4. A method according to claim 1, wherein the heating to the crystallization range of temperature is effected by directing radiant heat on to the gas-supported material from an extensive source of radiant heat close to the material.

5. A method according to claim 1, comprising forming a series of sheets of said vitreous material and heating them to said temperature at which the dispersion of centers of incipient crystal growth is generated, advancing the sheets sequentially along the gaseous support and heating them rapidly during their continued advance up to the crystallization range, holding the sheets in that temperature range while they continue to advance along the gaseous support, and then cooling the sheets of glass ceramic material so formed prior to removing them from the gaseous support.

6. A method according to claim 5, wherein the sheets are heated up to the temperature at which the dispersion is generated while being advanced by a conveyor to the gaseous support.

7. A method according to claim 1, for manufacturing glass ceramic material in continuous ribbon form, comprising continuously forming a ribbon from a melt of said vitreous material, cooling the ribbon to said temperature at which the dispersion of centers of incipient crystal growth is generated, advancing the ribbon along the gaseous support and heating the advancing material rapidly to the crystallization range and maintaining the ribbon at that temperature while it continues to advance, and then cooling the ribbon of glass ceramic material so formed prior to removing it from the gaseous support.

References Cited
UNITED STATES PATENTS

| | | | |
|---|---|---|---|
| 3,464,807 | 9/1969 | Pressau | 65—33 X |
| 3,453,352 | 7/1969 | Goundry | 65—33 X |
| 3,223,501 | 12/1965 | Fredley et al. | 65—33 X |
| 3,499,773 | 3/1970 | Petticrew et al. | 65—33 X |
| 3,485,644 | 12/1969 | Shonebarger | 65—33 X |

OTHER REFERENCES

Handbook of Glass Manufacture, vol. II, Fay V. Tooley, Odgen pub., 1960.

FRANK W. MIGA, Primary Examiner

U.S. Cl. X.R.

65—182 A, 65